Feb. 27, 1923.
A. T. BROWN
1,446,824
GEAR SHIFTING MECHANISM
Filed July 15, 1918
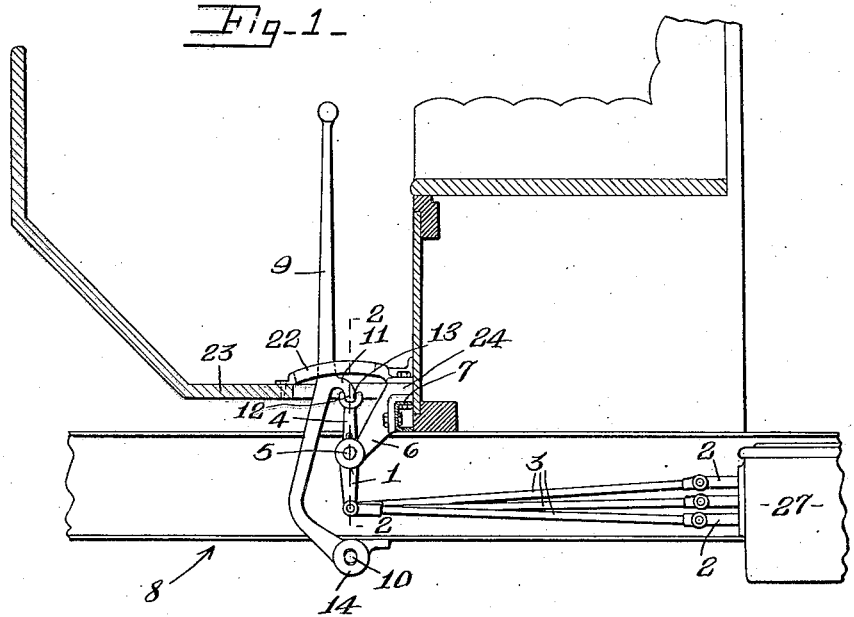
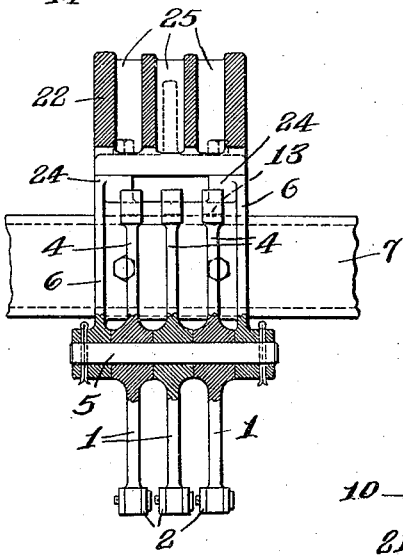
INVENTOR
Alexander T. Brown.
BY
Parsons & Bodell.
ATTORNEYS Patented Feb. 27, 1923.

1,446,824

UNITED STATES PATENT OFFICE.

ALEXANDER T. BROWN, OF SYRACUSE, NEW YORK, ASSIGNOR TO BROWN-LIPE GEAR COMPANY, OF SYRACUSE, NEW YORK, A CORPORATION OF NEW YORK.

GEAR-SHIFTING MECHANISM.

Application filed July 15, 1918. Serial No. 244,982.

*To all whom it may concern:*

Be it known that I, ALEXANDER T. BROWN, a citizen of the United States, and a resident of Syracuse, in the county of Onondaga and State of New York, have invented a certain new and useful Gear-Shifting Mechanism, of which the following is a specification.

This invention relates to shifting mechanism for transmission gearing of motor vehicles which mechanism is particularly simple in construction and highly efficient in use, and it consists in the novel features and in the combinations and constructions hereinafter set forth and claimed.

In describing this invention, reference is had to the accompanying drawings in which like characters designate corresponding parts in all the views.

Figure 1 is a side elevation of this shifting mechanism, the contiguous part of the body of a motor vehicle being shown in section, and also the contiguous portion of a gear box being shown.

Figure 2 is an enlarged transverse sectional view, partly in elevation, taken on the plane of line 2—2, Fig. 1.

Figure 3 is a plan view of the guide plate for the operating lever.

Figure 4 is a detail view of the operating lever showing the pivotal bearing therefor in section.

This gear shifting mechanism comprises generally, motion transmitting and multiplying members, and an operating lever having selecting and shifting movements, the operating lever having means for selectively coacting with the said members.

1 designates the motion transmitting and multiplying members which are here shown as shifting levers pivoted between their ends, one arm of each lever, as the lower arm, being connected to a shifting rod 2 by a link 3 and the other or upper arm 4 being provided with means for coacting with the selecting finger of the operating lever. In the illustrated form of my invention, the levers 1 are mounted on a shaft 5 supported in brackets 6 which are mounted upon a cross bar 7 of the frame 8 of a motor vehicle.

9 designates the operating lever which is mounted on a shaft 10 and is provided with a selecting and shifting finger 11, the finger extending rearwardly from the lever and having an engaging downturned end 12 for coacting with the notches 13 in the upper arms 4 of the shifting levers 1.

The lever 9 is here shown as pivoted at its lower end below the axis of the levers 1 and the finger 11 as located between the ends of the lever 9.

The lever 9 is mounted upon the shaft 10 to shift about the axis of said shaft and also to have a lateral rocking movement, the latter movement carrying the selecting finger 11 laterally into and out of the notch 13 of any of the shifting levers 1, said lever 9 being movable about its axis to shift the lever so selected.

As seen in Fig. 4, the lever 9 has a hub or bearing 14 on the shaft 10, the bearing 14 having inclined or outwardly diverging faces 15 which meet substantially centrally of the hub in a fulcrum 19, the faces 15 diverging from the fulcrum so as to permit the lever to rock laterally on the shaft 10 about the fulcrum 19.

The end faces 20 of the hub or bearing are curved about a center to coact with abutments or thrust bearings 21 which hold the hub 20 from lateral shifting movement at its lower end while the lever 9 is being shifted laterally, the faces 20 engaging the abutments 21 during the selecting movement of the lever 9.

22 is a guide plate located near the floor 23 of the vehicle, and mounted at one end on the base 24 of the bracket 7 and at its other end on the floor 23 of the motor vehicle, the plate having suitable guide slots 25 and a cross over slot 26, for governing the shifting and the selecting movements of the lever 9.

The shifting rods 2 extend into the case 27 and coact with suitable shifting forks as will be understood by those skilled in the art.

Owing to the arrangement of the operating lever and the motion transmitting and multiplying levers, ample space is provided between the axis of the operating lever and the guide plate located close to the floor, and the movement of the operating lever is increased through the shifting levers whereby the shifting movement is effected upon a small movement of the operating lever.

What I claim is:

1. In a gear shifting mechanism, the combination of motion transmitting members arranged in a row, an operating lever having a selecting movement lengthwise of the row and an operating movement crosswise of the row, the lever having a finger projecting toward the row of members for selectively engaging any one of said members, the portion of the lever opposed to the row of members being curved away from said members out of the range of movement of said members to provide space for the shifting movement of the operating member toward the row of members, substantially as and for the purpose described.

2. In a gear shifting mechanism, the combination of a row of motion transmitting levers, an operating lever having a selecting movement lengthwise of the row, and a shifting movement in the direction transversely of the row, the operating lever being pivoted below the axis of the levers, the motion transmitting levers having transversely extending notches, and the operating lever having a finger extending in the direction of movement of such operating lever and arranged to enter the notch of any one of the motion transmitting levers during the selecting movement of the operating lever.

3. In a gear shifting mechanism, the combination of motion transmitting members arranged in a row, an operating lever having a selecting movement lengthwise of the row and a shifting movement in a direction transversely of the row, the lever being pivoted at its lower end below the row of members and having a forwardly extending finger above the row of members for selectively engaging any one of the members, the portion of the lever between the finger and the axis of the operating lever being curved away from the row of members to provide space for the shifting movement of the operating lever toward the row of members, substantially as and for the purpose specified.

In testimony whereof, I have hereunto signed my name, at Syracuse, in the county of Onondaga, and State of New York, this 5th day of July, 1918.

ALEXANDER T. BROWN.